(12) United States Patent
Khan et al.

(10) Patent No.: US 7,200,115 B2
(45) Date of Patent: Apr. 3, 2007

(54) METHOD OF MANAGING NON-ACKNOWLEDGEMENT RESPONSES

(75) Inventors: Farooq Ullah Khan, Manalapan, NJ (US); Douglas N. Knisely, Wheaton, IL (US); Safwan Zaheer, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1050 days.

(21) Appl. No.: 10/147,473

(22) Filed: May 17, 2002

(65) Prior Publication Data
US 2003/0214935 A1  Nov. 20, 2003

(51) Int. Cl.
*H04J 1/16* (2006.01)

(52) U.S. Cl. ............................ 370/236; 370/475

(58) Field of Classification Search ............... 370/236, 370/475, 476
See application file for complete search history.

(56) References Cited

U.S. PATENT DOCUMENTS

| 5,031,179 A | | 7/1991 | Yoshida et al. | |
|---|---|---|---|---|
| 6,091,710 A | * | 7/2000 | Mawhinney | 370/236 |
| 6,181,704 B1 | * | 1/2001 | Drottar et al. | 370/410 |
| 6,665,313 B1 | * | 12/2003 | Chang et al. | 370/469 |
| 6,795,412 B1 | * | 9/2004 | Lee | 370/329 |
| 6,950,404 B2 | * | 9/2005 | Pearl | 370/252 |
| 2003/0031230 A1 | * | 2/2003 | Kwon et al. | 375/130 |
| 2003/0206538 A1 | * | 11/2003 | Rezaiifar et al. | 370/335 |
| 2005/0169225 A1 | * | 8/2005 | Dick et al. | 370/342 |

FOREIGN PATENT DOCUMENTS

| WO | WO 00/21262 | 4/2000 |
|---|---|---|
| WO | WO 02/15510 | 2/2002 |

OTHER PUBLICATIONS

Tsai, Duei et al. "Error-Correction Scheme for the NASA Deep Space Network Ground Communication Facility Upgrade." IEEE International Conference on Communications. BOSTONICC/89 Jun. 11-14, 1989 (pp. 0804-0808).

* cited by examiner

*Primary Examiner*—Hassan Kizou
*Assistant Examiner*—Jay P. Patel

(57) ABSTRACT

In the method, a receiver receives an indication of if the maximum number of sub-packet transmissions for conveying a data packet from a transmitter to the receiver has taken place. If the receiver has not properly received the data packet over a channel when this indication is received, then the receiver sends a non-acknowledgement response that causes the transmitter to re-schedule and re-send the data packet.

16 Claims, 1 Drawing Sheet

| STATUS BIT 1 | SERVICE ID 1 | . . . | STATUS BIT n | SERVICE ID n |
|---|---|---|---|---|

| STATUS BIT 1 | SERVICE ID 1 | ... | STATUS BIT n | SERVICE ID n |
|---|---|---|---|---|

METHOD OF MANAGING NON-ACKNOWLEDGEMENT RESPONSES

BACKGROUND OF THE INVENTION

1. Technical Field

The present invention relates to wireless communication, and more particularly, a method of managing non-acknowledgement (NAK) responses sent by a receiver in a wireless communication system.

2. Description of Related Art

In wireless communication systems, an air interface is used for the exchange of information between a mobile station and a base station or other communication system equipment. The air interface typically comprises a plurality of communication channels. In wireless transmission, a channel is time varying due to fading, mobility, and so on. More specifically, channel quality may be affected by factors such as distance between the mobile and base station, speed of the mobile station, interference, and the like. Given the limited resources (e.g., bandwidth) of wireless transmission as well as the large number of mobile stations supported by a base station at any given time, and therefore competing for those limited resources, it is important to maximize throughput of a wireless communication system.

Protocols such as the Hybrid-Automated Repeat reQuest (H-ARQ) have been introduced to improve the overall system capacity. FIG. 1 illustrates a portion of the layered structure for a transmitter 10 (e.g., such as in a base station) and a receiver 20 (e.g., such as in a mobile station) in a wireless communication system as set forth in third generation wireless standards such as CDMA-2000 employing H-ARQ. In CDMA-2000, for example, the H-ARQ may be called Asynchronous and Adaptive Incremental Redundancy (AAIR). As shown, a Radio Link Protocol (RLP) 12 in the medium access control (MAC) 14 layer of the transmitter sends data packets for transmission to a physical layer 16. The data packets include a sequence number identifying their order in a sequence of transmitted data packets. The physical layer 16 turbo encodes the data packet and transmits a portion of the encoded data packet—this portion being referred to as a sub-packet—over a H-ARQ channel assigned for communication between the transmitter 10 and the receiver 20. The physical layer 26 of the receiver 20 receives the sub-packet and attempts to decode the sub-packet to obtain the entire data packet. If successful, the data packet is sent to the RLP 22 in the MAC 24 of the receiver 20. The physical layer 26 also sends an acknowledgement response (ACK) to the transmitter 10 for a properly received data packet. If the physical layer 26 is unable to decode the sub-packet, then the physical layer 26 sends a non-acknowledgement (NAK) response to the transmitter 10.

The physical layer 16 of the transmitter 10 expects to receive an ACK or NAK response two time slots after sending the sub-packet. In CDMA-2000, for example, a time slot is 1.25 ms. If an ACK response is received from the physical layer 26, the physical layer 16 encodes and transmits another data packet to any scheduled user in the system. If no response or a NAK response is received from the physical layer 26, the physical layer 16 transmits the next sub-packet to the same user. Standards such as CDMA-2000 establish a maximum number of sub-packet transmissions for each packet. When the maximum number of sub-packet transmissions is reached, the physical layer 16 flushes the data packet in its buffer. The physical layer 16 then encodes and transmits another data packet for a user, which is scheduled by the transmitter 10.

In the system described above, it is possible that the RLP 22 of the receiver 20 receives data packets having sequence numbers 1 and 3, respectively, before receiving the data packet of sequence number 2. For example, the three data packets may be sent over three different H-ARQ channels to the receiver 20 and it may take more sub-packet transmissions for proper receipt of data packet 2 as compared to that of data packets 1 and 3. When this happens, the RLP 22 judges the data packet of sequence number 2 as missing and issues a NAK response, which is sent to and received by the RLP 12 of the transmitter 10. In response to the NAK response, the RLP 12 reschedules transmission of the data packet having sequence number 2. However, the data packet having sequence number 2 may eventually be properly received as a result of later sub-packet transmissions; thus, rendering the rescheduling moot. Even if this occurs, the rescheduling continues, and resources and capacity are wasted.

SUMMARY OF THE INVENTION

In one aspect of the present method of managing non-acknowledgement (NAK) responses, a status identifier is sent to the receiver for a channel assigned to the receiver. The status identifier for the channel indicates whether a maximum number of sub-packet transmissions for a data packet have taken place. When the status identifier for the channel indicates that the maximum number of sub-packet transmissions have taken place, the receiver sends a NAK response if it has not yet received the data packet.

In another aspect of the method, a number of sub-packet transmissions for a data packet being sent over a channel to the receiver are counted, and a channel identifier, identifying the channel to the receiver, is sent to the receiver if the count number reaches a maximum number of permitted sub-packet transmissions. In response to receipt of the channel identifier, and if the data packet being sent over the channel has not been properly received, the receiver sends a NAK response for the channel. In an alternative to this aspect of the invention, a service identifier is sent instead of the channel identifier. In this alternative, each channel carries a data packet associated with a different service such that identification of the service means identification of the channel.

In a still further aspect of the method, a status identifier and a service identifier are sent to the receiver for a channel assigned to the receiver. The service identifier identifies a type of service (e.g., Voice over IP, e-mail, etc.) associated with a data packet being sent over the channel and the status identifier indicates whether a maximum number of sub-packet transmissions for the data packet have taken place. The receiver sends a NAK response if the status identifier indicates that the maximum number of sub-packet transmissions for the data packet have taken place and the data packet has not been properly received. In this embodiment, the receiver identifies the channel associated with the status identifier based on at least one of the service identifier and a position of the status identifier in a sequence of received information.

In the above described aspects of the invention, the channel is at least one of a Hybrid-Automated Repeat request (H-ARQ) and an Automated Repeat reQuest channel.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limitative of the present invention and wherein.

DETAILED DESCRIPTION

Figures 1, 2:
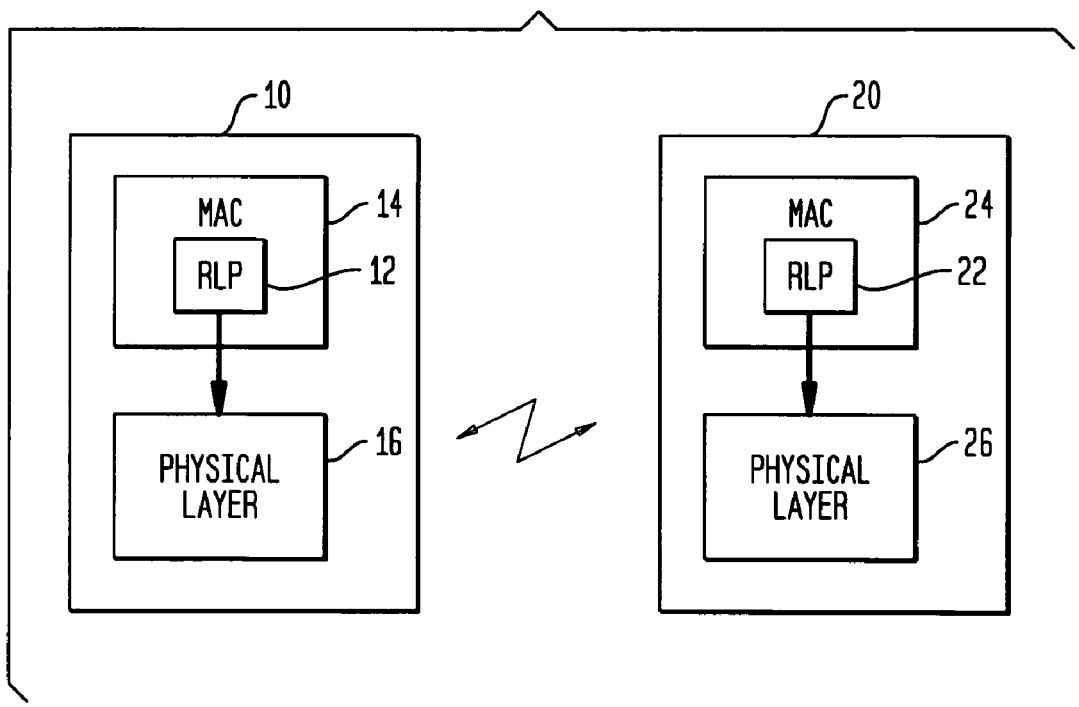
FIG. 1 illustrates a portion of the layered structure for a transmitter and a receiver in a wireless communication system as set forth in third generation wireless standards employing H-ARQ.
FIG. 2 illustrates the format of a bit sequence transmitted over a control channel according to one embodiment of the present invention.

The method of managing non-acknowledgement (NAK) responses from a receiver in a wireless communication system that employs a Hybrid Automated Repeat reQuest (H-ARQ) protocol will be described with respect to the portion of the wireless communication system illustrated in FIG. 1. However, it should be understood that the present invention is not limited to use with a CDMA-2000 compliant system, but instead is applicable to any system employing a H-ARQ type protocol (such as, for example, UMTS). As discussed above, the receiver 20 has a certain number of H-ARQ channels associated therewith. Each H-ARQ channel carries a separate encoded data packet as discussed above in the Background of the Invention section. Namely, sub-packets of a data packet are sent over the H-ARQ channel by the physical layer 16. In a first embodiment, the physical layer 16 also generates a status bit for each H-ARQ channel, and sends the status bits over a control channel to the receiver 20. For example, if the receiver 20 has four H-ARQ channels associated therewith, then there are four status bits. The status bit indicates whether a maximum number of sub-packet transmissions for a data packet being sent over the H-ARQ channel have taken place. A logical '1' status bit represents a pending sub-packet transmission, and a logical '0' status bit represents no more sub-packet transmission will take place (i.e., the maximum number of sub-packet transmissions have taken place).

The status bits of the n H-ARQ channels of the receiver 20 are sent by the physical layer 16 as a sequence over a control channel directed to the receiver 20 or a common control channel. So that the physical layer 26 of the receiver 20 can identify that the status bit sequence is intended for the receiver 20 when the status bit sequence is sent over a common control channel, the physical layer 16 sends an identifier of the receiver 20, for example, the MAC ID of the receiver 20, along with the status bit sequence.

The physical layer 26 indicates the status of the H-ARQ channels to the RLP 22 of the receiver 20. The RLP 22 uses the status in determining whether to send a NAK response for a H-ARQ channel to the transmitter 10. Specifically, the RLP 22 will not send a NAK response for a H-ARQ channel unless the data packet being transmitted on a H-ARQ channel has not been properly received and the status of the H-ARQ channel indicates that the maximum number of sub-packet transmission have taken place (e.g. a logical '0' status bit indicating no more sub-packet transmission will take place).

Accordingly this embodiment of the present invention improves capacity by preventing needless re-scheduling and transmission of data packets. For example, if the RLP 22 of the receiver 20 receives data packets having sequence numbers 1 and 3, respectively, before receiving the data packet of sequence number 2, the RLP 22 will not automatically issue a NAK response for the data packet having a sequence number of 2. Instead, if the status bit for the H-ARQ channel carrying the data packet having a sequence number of 2 indicates that sub-packet transmissions are pending, the RLP 22 will not send a NAK response. If the data packet having a sequence number of 2 is successfully received before receipt of a logic '0' status bit, this methodology will prevent needless re-scheduling and transmission of the data packet having a sequence number of 2.

In another embodiment of the present invention, the physical layer 16 assigns a counter to each H-ARQ channel. Each counter counts the number of sub-packet transmissions for a data packet on the assigned H-ARQ channel. A counter for a H-ARQ channel is initially set to zero, and is incremented after each successive sub-packet transmission. Once the counter reaches the maximum number of permitted sub-packet transmissions, the physical layer 16 sends a H-ARQ channel identifier (e.g., the ARQ Channel ID in CDMA-2000) for the H-ARQ channel associated with that counter to the receiver 20 over a control channel directed to the receiver 20 or a common control channel. So that the physical layer 26 of the receiver 20 can identify that the H-ARQ channel identifier is intended for the receiver 20 when the H-ARQ channel identifier is sent over a common control channel, the physical layer 16 sends an identifier of the receiver 20, for example, the MAC ID of the receiver 20, along with the H-ARQ channel identifier. The counter for a H-ARQ channel is reset to zero when the maximum permitted sub-packets are transmitted or when a new data packet is to be transmitted over the H-ARQ channel.

The physical layer 26 indicates the H-ARQ channel identifier to the RLP 22 of the receiver 20. The RLP 22 uses the H-ARQ channel identifier in determining whether to send a NAK response for the identified H-ARQ channel to the transmitter 10. Specifically, the RLP 22 will not send a NAK response for a H-ARQ channel unless the data packet being transmitted on a H-ARQ channel has not been properly received and the H-ARQ channel has been identified.

Accordingly this embodiment of the present invention improves capacity by preventing needless re-scheduling and transmission of data packets. For example, if the RLP 22 of the receiver 20 receives data packets having sequence numbers 1 and 3, respectively, before receiving the data packet of sequence number 2, the RLP 22 will not automatically issue a NAK response for the data packet having a sequence number of 2. Instead, the RLP 22 does not send a NAK response until it receives the H-ARQ channel identifier for the H-ARQ channel carrying the data packet having the sequence number 2. If the data packet having a sequence number of 2 is successfully received before receipt of the H-ARQ channel identifier, this methodology will prevent needless re-scheduling and transmission of the data packet having a sequence number of 2.

In a variation of this embodiment, when a data packet for a different service (Voice over IP, e-mail, SMS, etc.) are assigned on different H-ARQ channels, instead of sending the H-ARQ channel identifier, the service identifier (e.g., the SR-ID in CDMA-2000) is sent. Because that service identified by the service identifier is only using one of the H-ARQ channels, the receiver 20 knows the H-ARQ channel from the service identifier. Accordingly, in this variation of the above described embodiment, the RLP 22 will not send a NAK response for a H-ARQ channel unless the data packet being transmitted on a H-ARQ channel has not been properly received and the service identifier for the service being received over that H-ARQ channel has been identified.

In a further embodiment of the present invention, the physical layer 16 generates a status bit for each H-ARQ channel, and sends a bit sequence having a format as shown in FIG. 2 over a control channel to the receiver 20. As shown, the bit sequence include a status bit for the first H-ARQ channel, a service identifier (e.g., the SR-ID in CDMA-2000) for the first H-ARQ channel, . . . , the status bit for the nth H-ARQ channel, and the service identifier for the nth H-ARQ channel over a control channel to the receiver 20. The status bit indicates whether a maximum number of sub-packet transmissions for a data packet being sent over the H-ARQ channel have taken place. A logical '1' status bit represents a pending sub-packet transmission, and a logical '0' status bit represents no more sub-packet transmission will take place (i.e., the maximum number of sub-packet transmissions have taken place). The service identifier identifies the type of service associated with the data packet being sent over the H-ARQ channel. Types of services include, but are not limited to, Voice over IP, e-mail, SMS, etc.

The bit sequence of FIG. 2 is sent over a control channel directed to the receiver 20 or a common control channel. So that the physical layer 26 of the receiver 20 can identify that the bit sequence is intended for the receiver 20 when the bit sequence is sent over a common control channel, the physical layer 16 sends an identifier of the receiver 20, for example, the MAC ID of the receiver 20, along with the bit sequence.

The physical layer 26 indicates the status of each of the services on the H-ARQ channels to the RLP 22 of the receiver 20. In one version of this embodiment, the receiver 20 identifies the H-ARQ channel to which a status bit in the bit sequence corresponds based on the service identifier paired with the status bit. Namely, if the service identifier indicates the service is e-mail, and e-mail data packets are being received over the first H-ARQ channel, then the receiver 20 knows that the status bit associated with this service identifier is for the first H-ARQ channel. In another version of this embodiment, the receiver 20 identifies the H-ARQ channel to which a status bit in the bit sequence corresponds based on the position of the status bit. For example, if the service identifier is 3 bits long, then the receiver 20 knows, a priori, that the first bit in the bit sequence is the status bit for the first H-ARQ channel, the fifth bit in the bit sequence is for the second H-ARQ channel, the ninth bit in the bit sequence is for the third H-ARQ channel, etc.

The RLP 22 uses the status information in determining whether to send a NAK response for a H-ARQ channel to the transmitter 10. Specifically, the RLP 22 will not send a NAK response for a H-ARQ channel unless the data packet being transmitted on a H-ARQ channel has not been properly received and the status for the H-ARQ channel indicates that the maximum number of subpacket transmissions have taken place (i.e., a logical '0' status bit representing no more sub-packet transmission will take place).

Accordingly this embodiment of the present invention improves capacity by preventing needless re-scheduling and transmission of data packets. For example, if the RLP 22 of the receiver 20 receives data packets having sequence numbers 1 and 3, respectively, before receiving the data packet of sequence number 2, the RLP 22 will not automatically issue a NAK response for the data packet having a sequence number of 2. Instead, if the status bit for the H-ARQ channel carrying the data packet having a sequence number of 2 indicates that sub-packet transmissions are pending, the RLP 22 will not send a NAK response. If the data packet having a sequence number of 2 is successfully received before receipt of a logic '0' status bit, this methodology will prevent needless re-scheduling and transmission of the data packet having a sequence number of 2.

The invention being thus described, it will be obvious that the same may be varied in many ways. For example, while the present invention has been described as applied to systems employing H-ARQ, the present invention is applicable to systems applying Automated Repeat reQuest (ARQ). Such variations are not to be regarded as a departure from the spirit and scope of the invention, and all such modifications as would be obvious to one skilled in the art are intended to be included within the scope of the following claims.

We claim:

1. A method of managing non-acknowledgement (NAK) responses, comprising:
sending a status identifier to a receiver for each channel assigned to the receiver, the status identifier indicating whether a maximum number of sub-packet transmissions for a data packet being sent over the channel have taken place, and wherein
the sending step sends the status identifier for all of the channels assigned to the receiver together as a status identifier sequence.

2. The method of claim 1, wherein the sending step sends each status identifier over a control channel.

3. The method of claim 2, wherein
the control channel is a common control channel; and
the sending step sends an identifier of the receiver with each status identifier.

4. The method of claim 1, wherein the channel is one of a Hybrid Automated Repeat request (H-ARQ) and an Automated Repeat reQuest (ARQ) channel.

5. A method of managing non-acknowledgement (NAK) responses, comprising:
receiving a status identifier for each channel assigned to the receiver, the status identifier indicating whether a maximum number of sub-packet transmissions for a data packet being sent over the channel have taken place;
sending a NAK response from the receiver if the status identifier indicates that the maximum number of sub-packet transmissions have taken place and the data packet has not been properly received; and wherein
the receiving step receives a plurality of status identifiers together as a status identifier sequence, the plurality of status identifiers for a plurality of channels.

6. The method of claim 5, wherein the receiving step receives each status identifier over a control channel.

7. The method of claim 6, wherein the receiving step receives each status identifier over a common control channel, and identifies each status identifier intended for the receiver based on a receiver identifier accompanying each status identifier.

8. The method of claim 5, wherein the channel is one of a Hybrid Automated Repeat reQuest (H-ARQ) and an Automated Repeat reQuest (ARQ) channel.

9. A method of managing non-acknowledgement (NAK) responses, comprising:
sending a status identifier and service identifier to the receiver for each channel assigned to the receiver, the service identifier identifies a type of service associated with a data packet being sent over the channel and the status identifier indicates whether a maximum number of sub-packet transmissions for the data packet has taken place, and wherein the sending step sends a sequence of alternating status identifiers and service identifiers for a plurality of channels assigned to the receiver.

10. The method of claim 9, wherein a position of each status identifier in the sequence identifies a channel with which each status identifier is associated.

11. The method of claim 9, wherein the sending step sends each status identifier and each service identifier to the receiver over a control channel.

12. The method of claim 9, wherein the channel is one of a Hybrid Automated Repeat reQuest (H-ARQ) and an Automated Repeat reQuest (ARQ) channel.

13. A method of managing non-acknowledgement (NAK) responses, comprising:

receiving a status identifier and service identifier for a data packet being sent over a channel, the service identifier identifying a type of service associated with the data packet being sent over the channel and the status identifier indicating whether a maximum number of sub-packet transmissions for the data packet has taken place;

identifying the channel associated with the status identifier based on a position of the status identifier in a sequence of received information; and sending a NAK response from the receiver if the status identifier indicates that the maximum number of sub-packet transmissions for the data packet being sent over the channel have taken place and the data packet has not been properly received.

14. The method of claim 13, further comprising: identifying the channel associated with the status identifier based on the service identifier.

15. The method of claim 13, wherein the receiving step receives the status identifier and the service identifier over a control channel.

16. The method of claim 13, wherein the channel is one of a Hybrid Automated Repeat reQuest (H-ARQ) and an Automated Repeat request (ARQ) channel.

* * * * *